US012646651B2

(12) United States Patent
Kumagai et al.

(10) Patent No.: US 12,646,651 B2
(45) Date of Patent: Jun. 2, 2026

(54) COIL DEVICE

(71) Applicant: TDK CORPORATION, Tokyo (JP)

(72) Inventors: Masaru Kumagai, Tokyo (JP); Tomohiro Furuichi, Tokyo (JP); Satoshi Denda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 677 days.

(21) Appl. No.: 18/178,752

(22) Filed: Mar. 6, 2023

(65) Prior Publication Data

US 2023/0290562 A1 Sep. 14, 2023

(30) Foreign Application Priority Data

Mar. 10, 2022 (JP) ................................ 2022-037400

(51) Int. Cl.
*H01F 27/24* (2006.01)
*H01F 27/22* (2006.01)
*H01F 27/32* (2006.01)

(52) U.S. Cl.
CPC ........... *H01F 27/325* (2013.01); *H01F 27/22* (2013.01); *H01F 27/24* (2013.01)

(58) Field of Classification Search
CPC ........ H01F 27/24; H01F 27/22; H01F 27/325; H03H 1/0007; H03H 7/0115
USPC .......... 333/175, 177, 181, 185; 336/90, 198, 336/200, 206, 219
See application file for complete search history.

(56) References Cited

U.S. PATENT DOCUMENTS

| | | | | |
|---|---|---|---|---|
| 2016/0189857 | A1* | 6/2016 | Imanishi | H01F 27/325 336/198 |
| 2019/0006090 | A1 | 1/2019 | Kan et al. | |
| 2021/0249180 | A1* | 8/2021 | Horikawa | H01F 27/02 |

FOREIGN PATENT DOCUMENTS

| | | | |
|---|---|---|---|
| JP | H05-95026 | U | 12/1993 |
| JP | 2008-153293 | A | 7/2008 |
| JP | 2013-201376 | A | 10/2013 |
| JP | 2015-043354 | A | 3/2015 |
| JP | 2019-012715 | A | 1/2019 |
| JP | 2019-054156 | A | 4/2019 |
| JP | 2020-043213 | A | 3/2020 |

* cited by examiner

*Primary Examiner* — Rakesh B Patel
(74) *Attorney, Agent, or Firm* — Oliff PLC

(57) ABSTRACT

A coil device 1 includes cores 30*b* and 30*c*; flat coils 93*a* to 93*d* each having a flat wire; a bobbin 20 having a through-hole 210 in which legs 33*b* and 33*c* of the cores 30*b* and 30*c* are disposed and accommodation grooves 220*a* to 220*d* into which the flat coils 93*a* to 93*d* are laterally inserted; and a retainer member 80 inserted into the through-hole 210 and disposed at inner circumferential sides of the flat coils 93*a* to 93*d*.

11 Claims, 11 Drawing Sheets

COIL DEVICE

TECHNICAL FIELD

The present invention relates to a coil device.

BACKGROUND

Known coil devices used as transformers or so include a coil device provided with a coil ("flat coil") having a flat wire as disclosed in, for example, Patent Document 1. In such a coil device, its bobbin may be made up of a plurality of parts, with which the flat coil may be covered from above and from below. Disposing the flat coil between the parts may allow the flat coil to be accommodated inside the bobbin.

Unfortunately, in such a case, because combining the parts with the flat coil is a complicated operation in accommodating the flat coil in the bobbin, it is not easy to manufacture the coil device. Also, because tolerance of the parts affects the positioning accuracy of the flat coil when the bobbin is made up of the plurality of parts, it is not easy to ensure sufficiently high positioning accuracy of the flat coil.

Patent Document 1: JP Utility Model Application Laid Open No. H5-95026

SUMMARY

The present invention has been achieved under such circumstances. It is an object of the present invention to provide a coil device that is easily manufactured and has excellent coil positioning accuracy.

To achieve the above object, a coil device according to the present invention comprises a core;

a flat coil having a flat wire;

a bobbin having a through-hole in which a leg of the core is disposed and an accommodation groove into which the flat coil is laterally inserted; and a retainer member inserted into the through-hole and disposed at an inner circumferential side of the flat coil.

The bobbin of the coil device according to the present invention has the accommodation groove into which the flat coil is laterally inserted. Thus, laterally inserting the flat coil into the accommodation groove allows the flat coil to be easily accommodated in the accommodation groove. Unlike the related art, the bobbin is not required to be made up of a plurality of parts in accommodating the flat coil. It is thus possible to omit a complicated operation such as combining the parts and the flat coil, allowing for easier manufacture of the coil device. The need for consideration of tolerance of the parts is also eliminated, allowing for sufficiently high positioning accuracy of the coil device.

The coil device according to the present invention includes, in particular, the retainer member inserted into the through-hole and disposed at the inner circumferential side of the flat coil. Inserting the retainer member into the through-hole while the flat coil is accommodated in the accommodation groove makes the inner circumferential side of the flat coil engage with the retainer member, which can prevent misalignment of the flat coil with respect to its insertion direction. Thus, the flat coil can be prevented from falling out through an insertion slot of the accommodation groove of the bobbin when laterally inserted into the accommodation groove. The flat coil can thus be fixed to a predetermined location of the accommodation groove. This allows for remarkable increase of positioning accuracy of the flat coil.

Preferably, the retainer member is made separately from the bobbin. Making the retainer member separately from the bobbin allows the retainer member to be attached to the bobbin afterwards. In particular, attaching the retainer member to the bobbin after the flat coil is accommodated in the accommodation groove prevents an insertion passage for the flat coil inside the accommodation groove from being blocked by the retainer member, allowing the flat coil to be smoothly inserted into the accommodation groove.

Preferably, the retainer member comprises a tubular portion; the leg of the core is disposed inside the tubular portion; and the tubular portion is disposed between an outer circumferential surface of the leg and an inner circumferential surface of the flat coil. This structure allows the tubular portion to favorably insulate the leg of the core from the flat coil. This structure also allows the retainer member to easily fit into the through-hole of the bobbin.

Preferably, the tubular portion has a hole penetrating a wall of the tubular portion along a radial direction thereof. This structure allows the hole to function as a passage through which a heat dissipating resin flows, for example, when a case of the coil device is filled with the heat dissipating resin. In this case, the heat dissipating resin filled into the case flows into the tubular portion through the hole. Thus, the retainer member (the tubular portion) can be sufficiently filled with the heat dissipating resin, allowing for greater heat dissipation particularly around the leg of the core disposed inside the tubular portion.

Preferably, the bobbin comprises a cylindrical portion and a flange extending radially outwards from an outer circumferential surface of the cylindrical portion; and the flange has the accommodation groove. This structure allows the inside of the flange (the accommodation groove) to accommodate the flat coil. Integrally forming the accommodation groove and the flange in this way can simplify the bobbin compared to when the accommodation groove is provided for the bobbin apart from the flange. Additionally, less space for the accommodation groove is needed, allowing the coil device to have a smaller size, by extension.

Preferably, the cylindrical portion has a cutout; and the cutout interrupts continuity of the cylindrical portion in an axial direction of the cylindrical portion at a location corresponding to the accommodation groove. This structure allows the insertion passage for the flat coil inside the accommodation groove to be prevented from being blocked by the cylindrical portion. Thus, the flat coil can be smoothly accommodated in the accommodation groove through the cutout of the cylindrical portion, without being obstructed by the cylindrical portion.

Preferably, the flange comprises an upper wall and a lower wall facing the upper wall in an axial direction of the bobbin; and the accommodation groove is provided between the upper wall and the lower wall. This structure allows the flat coil to be accommodated in the accommodation groove so as to be covered with the upper wall and the lower wall. Thus, the flat coil can be protected from the outside environment and effectively insulated from other conductors.

Preferably, the flange comprises a side wall connecting an outer edge of the upper wall and an outer edge of the lower wall along the axial direction of the bobbin; the flange has an insertion slot for inserting the flat coil into the accommodation groove; and the side wall is located opposite the insertion slot with respect to a direction orthogonal to the axial direction. With this structure, an end (opposite the insertion slot for the flat coil) of the accommodation groove in the depth direction is closed with the side wall. Thus, the flat coil can be prevented from falling off the accommodation groove from the end thereof in the depth direction when inserted through the insertion slot into the accommodation groove to the rear.

Preferably, the coil device further comprises a first coil including a first wire and a second coil including a second wire; the bobbin comprises a first bobbin provided with the first coil and a second bobbin provided with the second coil; and the flat coil is laterally inserted into the second bobbin. Providing one bobbin (the second bobbin) with both the flat coil and the second coil in this way allows the coil device to have a smaller size. Inserting the flat coil into the second bobbin (the accommodation groove) after, for example, the second coil is provided for the second bobbin allows the second coil to be provided for the second bobbin without being obstructed by the flat coil and allows the flat coil to be inserted into the second bobbin without being obstructed by the second coil.

Preferably, the core comprises a first core and a second core; the first bobbin has a first through-hole in which a first leg of the first core is disposed; the second bobbin has a second through-hole in which a second leg of the second core is disposed; and the first leg and the second leg have different widths in a direction orthogonal to an extending direction of the first and second legs. This structure allows the magnetic properties of the coil device to be adjusted in accordance with the difference between the width of the first leg of the first core and the width of the second leg of the second core.

Preferably, the coil device further comprises a case accommodating the core and the bobbin, and a heat dissipating resin filling the case. With this structure, the heat of the bobbin, the core, etc. is transferred from the heat dissipating resin to the case and further from the case to the outside. The heat of the bobbin, the core, etc. can thus be efficiently dissipated outside through the case and so on, allowing for greater heat dissipation of the coil device.

BRIEF DESCRIPTION OF THE DRAWING(S)

DETAILED DESCRIPTION

Figure 1A:
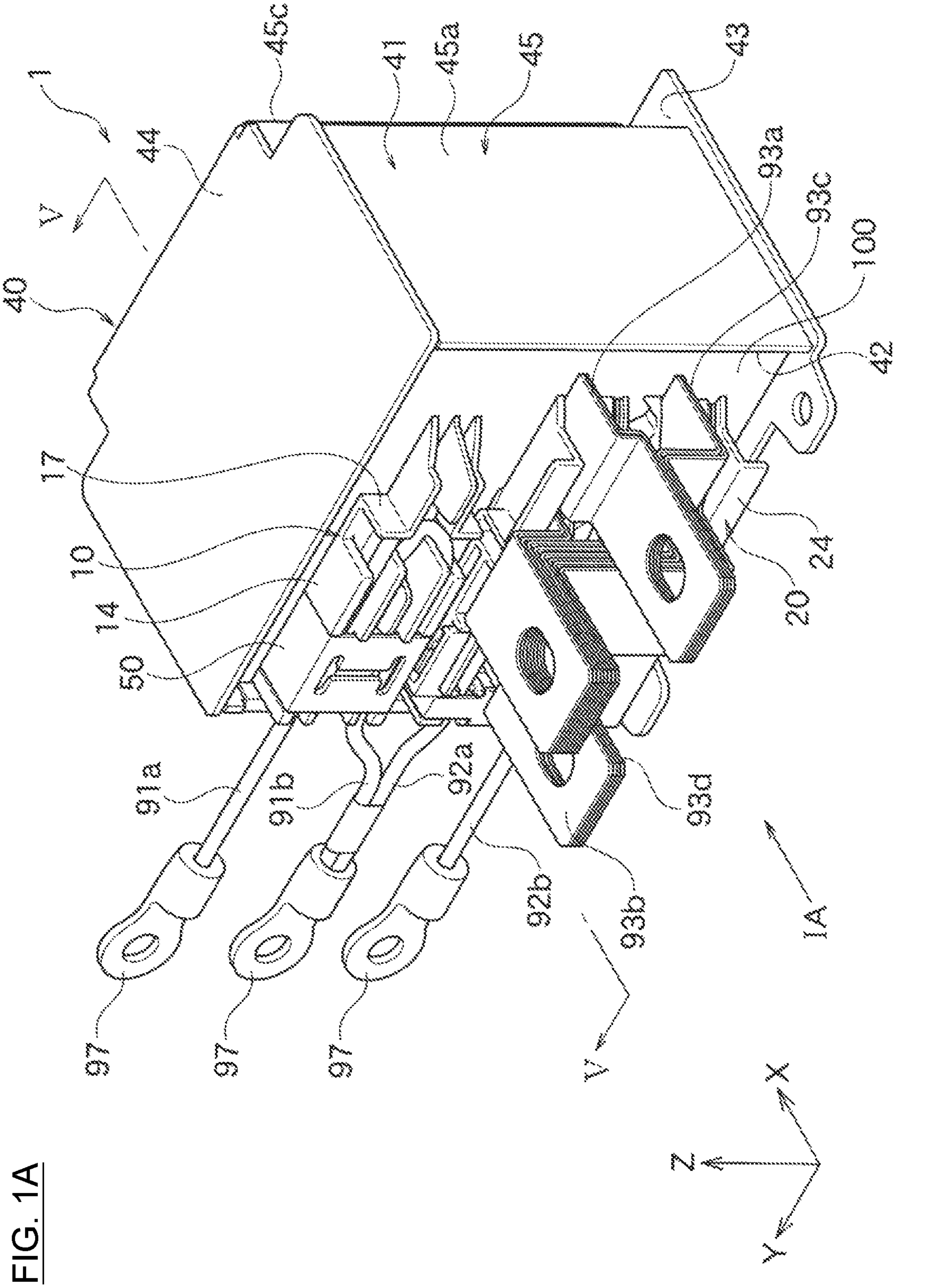
FIG. 1A is a perspective view of a coil device according to an embodiment of the present invention.

Hereinafter, the present invention will be explained based on an embodiment shown in the drawings.

A coil device 1 of the present embodiment shown in FIG. 1A functions as, for example, a transformer. The coil device 1 is used in an on-board charger, a power supply circuit of electronic equipment for home or industrial use, a power supply circuit of computer equipment, etc. In the drawings, the positive direction of the Z-axis is the upward direction, the negative direction of the Z-axis is the downward direction, and the direction orthogonal to the Z-axis is the lateral direction. The direction towards a center of the coil device 1 is the inward direction, and the direction away from the center of the coil device 1 is the outward direction.

Figure 2:
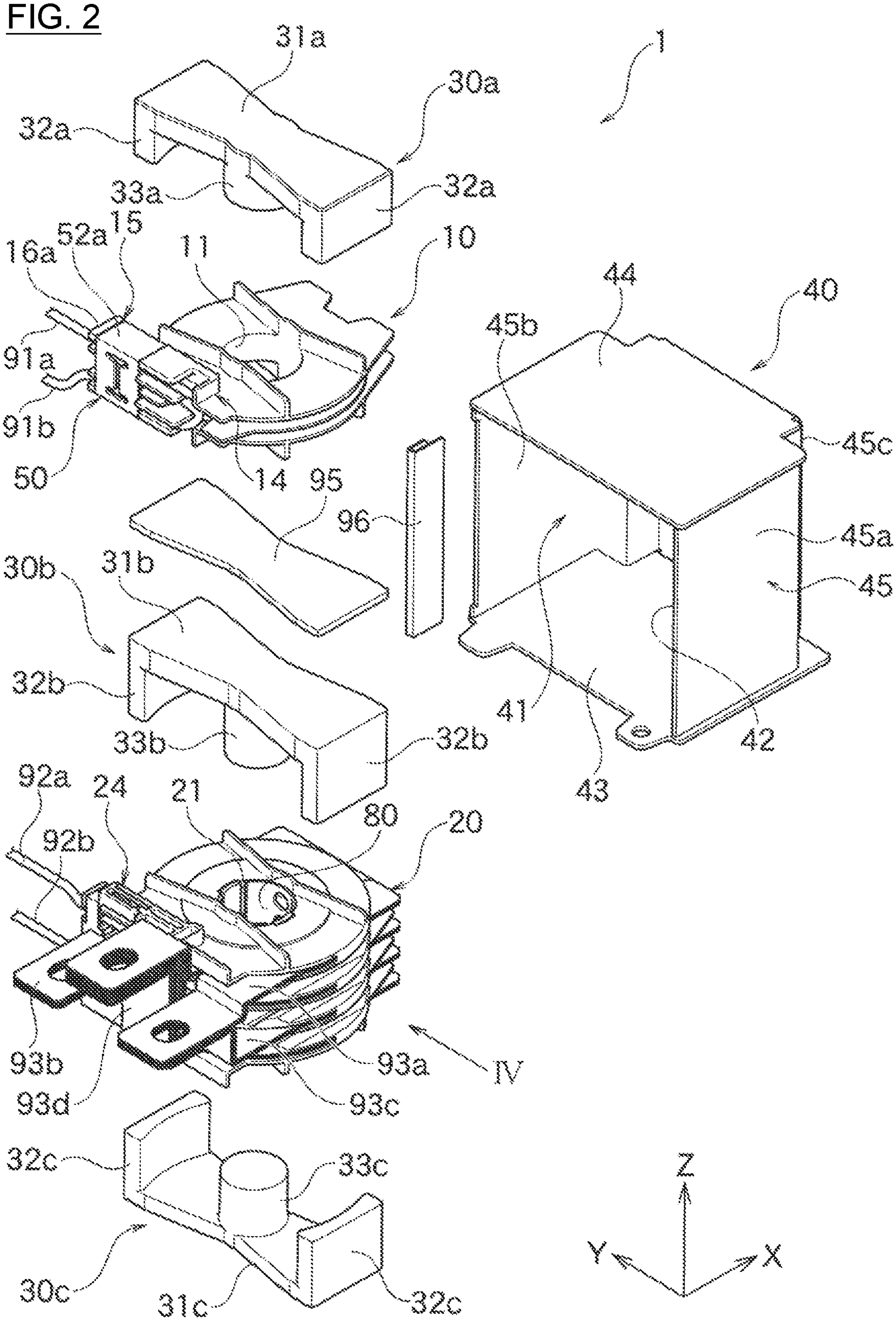
FIG. 2 is an exploded perspective view of the coil device shown in FIG. 1A.

As shown in FIG. 2, the coil device 1 includes a first bobbin 10, a second bobbin 20, cores 30*a* to 30*c*, a case 40, a first coil 91 (FIG. 7), a second coil 92 (FIG. 7), and flat coils 93*a* to 93*d*. The coil device 1 is a vertical type coil device. The axial direction (Z-axis direction) of the first bobbin 10 and the second bobbin 20 corresponds to the direction orthogonal to a mounting substrate (mounting surface) not shown in the drawings. The mounting substrate is disposed under the case 40.

The first coil 91 (FIG. 7) constitutes, for example, an inductor. The second coil 92 constitutes a primary coil (or a secondary coil) of the transformer. The flat coils 93*a* to 93*d* (FIG. 3) constitute the secondary coil (or the primary coil) of the transformer. Note that the first coil 91 may be omitted.

The first coil 91 and the second coil 92 are each made of a film insulated wire, which is a core wire (e.g., a copper wire) covered by an insulating film. Preferably, each of the wires of the first coil 91 and the second coil 92 has a diameter of 1.0 to 3.0 mm. The diameters of the wires may be the same or different.

As shown in FIG. 1A, a terminal 97 is attached to a leadout portion 91*a* of the first coil 91. The same applies to a leadout portion 92*b* of the second coil 92. Another terminal 97 is attached to a leadout portion 91*b* of the first coil 91 and a leadout portion 92*a* of the second coil 92 so as to bind these leadout portions. The first coil 91 and the second coil 92 are electrically connected via the leadout portions 91*b* and 92*a*.

Figure 3:
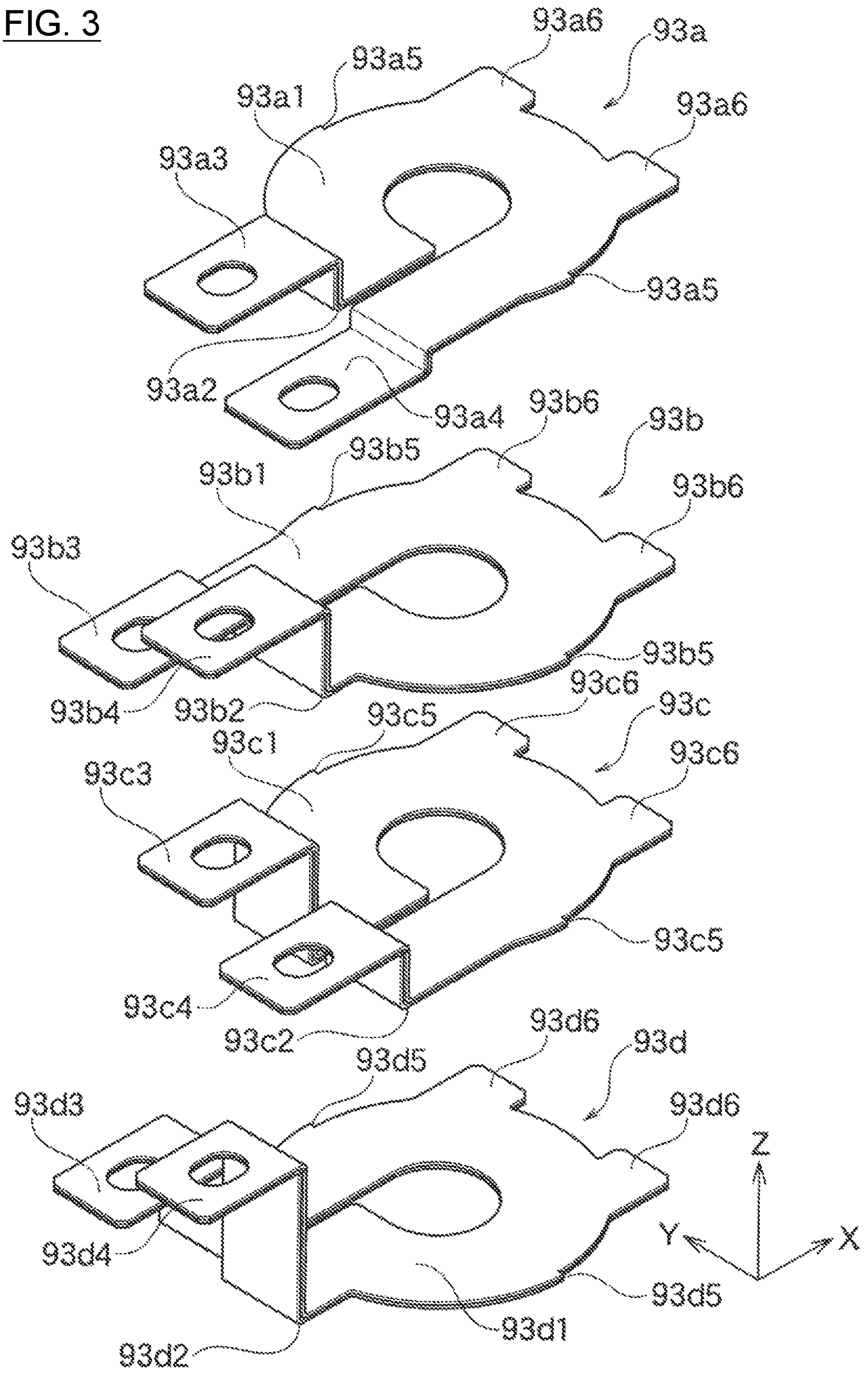
FIG. 3 is a perspective view of flat coils shown in FIG. 1A.

As shown in FIG. 3, each of the flat coils 93*a* to 93*d* has a substantially ring shape and is made of a conductor (e.g., sheet copper) having a flat shape. A relatively large current can be applied to the flat coils 93*a* to 93*d*. The flat coil 93*a* has a two-layer structure including two sheets, namely a sheet 93*a*1 and a sheet 93*a*2, to reduce AC resistance. Similarly, the flat coil 93*b* has a two-layer structure including two sheets, namely a sheet 93*b*1 and a sheet 93*b*2; the flat coil 93*c* has a two-layer structure including two sheets, namely a sheet 93*c*1 and a sheet 93*c*2; and the flat coil 93*d* has a two-layer structure including two sheets, namely a sheet 93*d*1 and a sheet 93*d*2. Note that a spacer (not shown in the drawings) may be disposed between the two sheets of each pair.

The flat coil 93*a* includes leadout portions 93*a*3, leadout portions 93*a*4, projecting portions 93*a*5, and protruding end portions 93*a*6. The flat coil 93*b* includes leadout portions 93*b*3, leadout portions 93*b*4, projecting portions 93*b*5, and protruding end portions 93*b*6. The flat coil 93*c* includes leadout portions 93*c*3, leadout portions 93*c*4, projecting portions 93*c*5, and protruding end portions 93*c*6. The flat coil 93*d* includes leadout portions 93*d*3, leadout portions 93*d*4, projecting portions 93*d*5, and protruding end portions 93*d*6.

Figure 4:
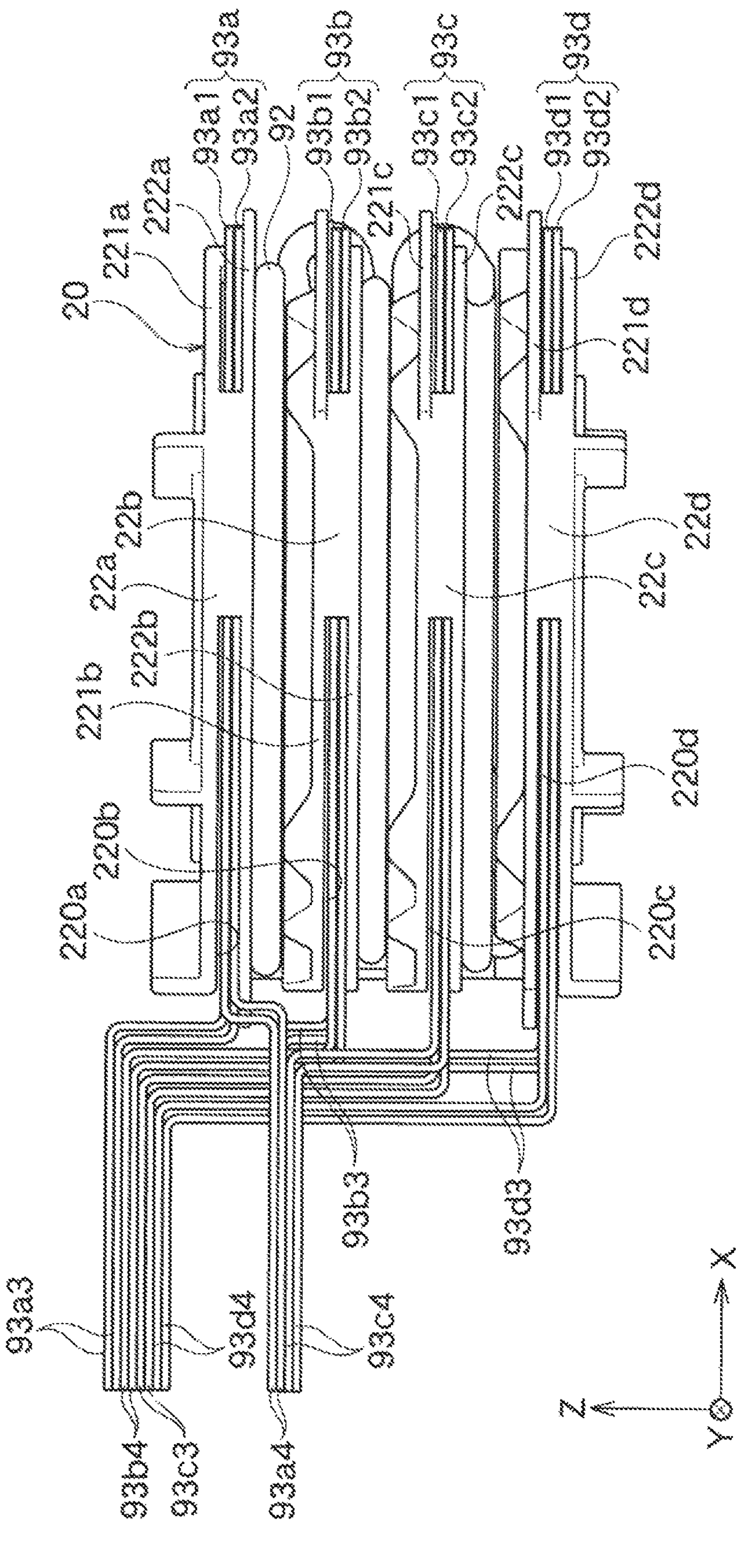
FIG. 4 is a side elevational view of a second bobbin shown in FIG. 2 viewed from direction IV.
Figure 5:
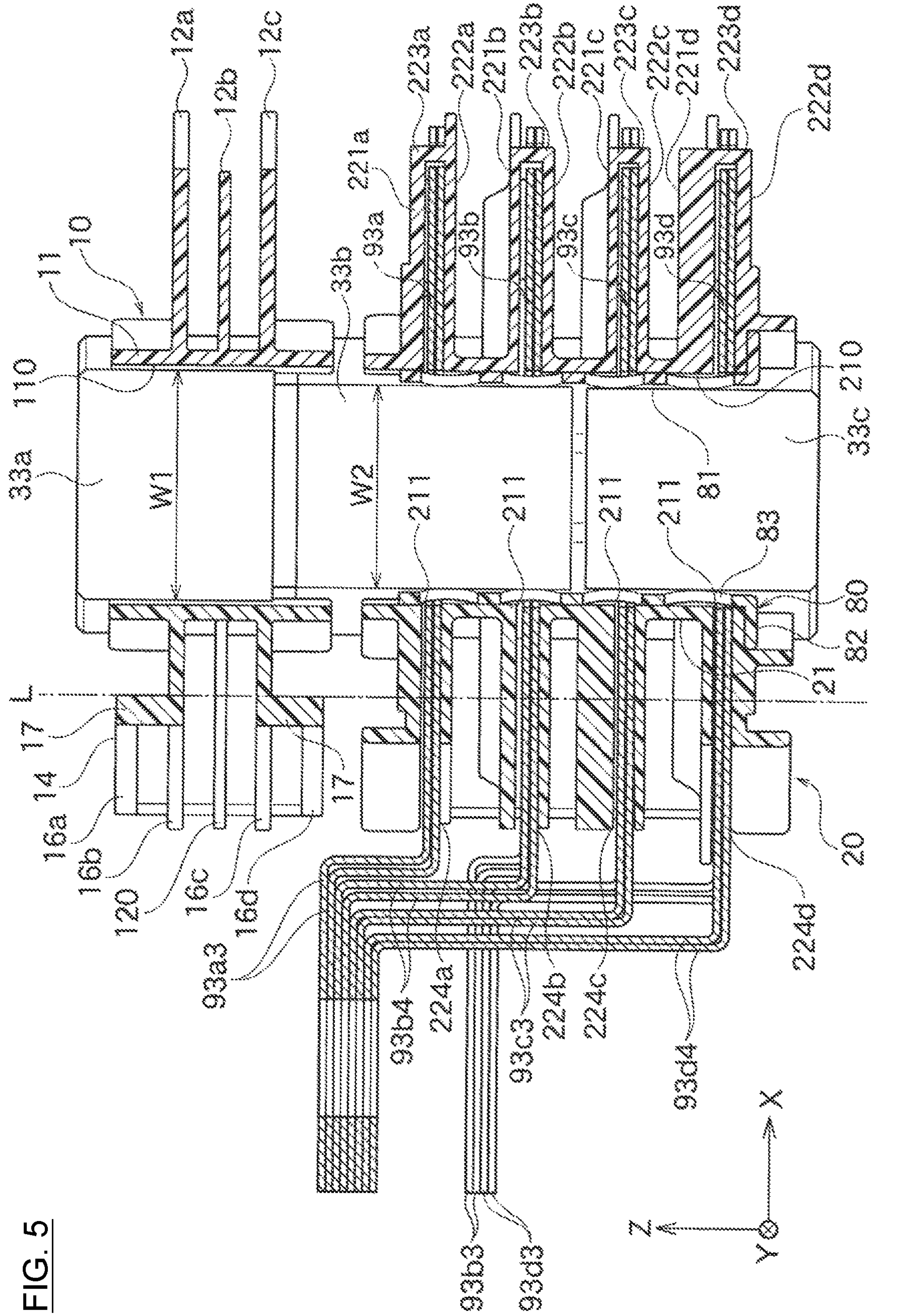
FIG. 5 is a sectional view along line V-V shown in FIG. 1A.

As shown in FIGS. 4 and 5, each of the leadout portions 93*a*3, 93*b*4, 93*c*3, and 93*d*4 has a bent shape and is disposed over one another. These leadout portions are electrically connected and constitute a terminal (e.g., a center tap). Each of the leadout portions 93*b*3 and 93*d*3 has a bent shape and is disposed over one another. These leadout portions are electrically connected and constitute a terminal. Each of the leadout portions 93*a*4 and 93*c*4 has a bent shape and is disposed over one another. These leadout portions are electrically connected and constitute a terminal.

As shown in FIG. 3, the projecting portions 93*a*5 to 93*d*5 are formed at outer edges of the flat coils 93*a* to 93*d* respectively. The flat coil 93*a* includes two projecting portions 93*a*5. These projecting portions 93*a*5 prevent the flat coil 93*a* from rotating (being misaligned) when the flat coil 93*a* is disposed in the second bobbin 20 (an accommodation groove 220*a* shown in FIG. 4). The projecting portions 93*b*5, 93*c*5, and 93*d*5 have the same structure and the same function as the projecting portions 93*a*5. This means that the projecting portions 93*b*5 to 93*d*5 prevent the flat coils 93*b* to 93*d* from rotating (being misaligned) when the flat coils 93*b* to 93*d* are disposed in the second bobbin 20 (accommodation grooves 220*b* to 220*d* shown in FIG. 4).

Each of the protruding end portions 93*a*6 has a protruding shape and is formed at an edge of the flat coil 93*a* in the positive direction of the X-axis, i.e., opposite the leadout portions 93*a*3 and 93*a*4 in the X-axis direction. The flat coil 93*a* includes two protruding end portions 93*a*6, which are disposed in close proximity to a third side 45*c* (FIG. 2) of the case 40. These protruding end portions 93*a*6 are disposed with a predetermined distance in between in the Y-axis direction. The protruding end portions 93*a*6 enhance heat dissipation of the flat coil 93*a* and prevent the flat coil 93*a* from rotating. The protruding end portions 93*b*6 to 93*d*6 have the same structure and the same functions as the protruding end portions 93*a*6.

As shown in FIG. 2, the case 40 accommodates the first bobbin 10, the second bobbin 20, the cores 30*a* to 30*c*, etc. The case 40 is made of, for example, a metal (e.g., aluminum) with excellent coolability. For example, the case 40 is formed by bend-shaping a metal plate. The case 40 includes a case body 41 having an opening (open side) 42.

The case body 41 is made up of a housing having one open side. The case body 41 accommodates the first bobbin 10, the second bobbin 20, the cores 30*a* to 30*c*, etc. Except at the opening 42, the case body 41 covers the first bobbin 10, the second bobbin 20, the cores 30*a* to 30*c*, etc. The case body 41 can be filled with a potting resin 100 (FIG. 1A). The potting resin 100 is a heat dissipating resin and is made from a resin, such as a silicone resin, a urethane resin, and an epoxy resin. The case body 41 includes a case bottom 43, a case top 44, and a case side 45.

The case bottom 43 has a substantially rectangular shape and is disposed substantially parallel to the mounting substrate (mounting surface) not shown in the drawings. Under the case bottom 43, for example, a foundation having a cooling mechanism is disposed. The case bottom 43 is fixed to the mounting substrate or so with fasteners (e.g., screws), other fixing members, or other adhesive materials. At corners of the case bottom 43, fastener holes for joining the fasteners may be formed.

The case top 44 is formed to face the case bottom 43 and is disposed substantially parallel to the case bottom 43. The case side 45 includes a first side 45*a*, a second side 45*b*, and the third side 45*c*. The first side 45*a*, the second side 45*b*, and the third side 45*c* extend upwards from three sides of the case bottom 43 at its outer edge. At the remaining side of the case bottom 43 at its outer edge, the case side 45 is not formed. The lower end of the case side 45 is connected to the case bottom 43. The upper end of the case side 45 is connected to the case top 44.

At the edge of the second side 45*b* in the negative direction of the X-axis, for example, a wire protecting member 96 made from an insulating material is attached. As explained later, the leadout portions of the first coil 91 and the second coil 92 are drawn outwards in the Y-axis direction in the vicinity of the opening 42. The wire protecting member 96 is used for preventing the leadout portions of the first coil 91 and the second coil 92 from being damaged by touching the edge of the second side 45*b* in the negative direction of the X-axis.

The opening 42 is provided at a location corresponding to the side where the case side 45 is not formed. The case 40 is provided with only one opening 42. The opening 42 is provided for the case body 41 at a location where the leadout portions of the first coil 91 and the second coil 92 are drawn outwards from the case 40 (FIG. 1A). The opening (open side) 42 is opened laterally on the case body 41 only in one direction (the negative direction of the X-axis).

As details will be explained later, part of the first bobbin 10 and part of the second bobbin 20 protrude laterally from the opening 42. Additionally, the leadout portions of the first coil 91 and the second coil 92 and the leadout portions of the flat coils 93*a* to 93*d* protrude laterally from the opening 42.

Figure 1B:
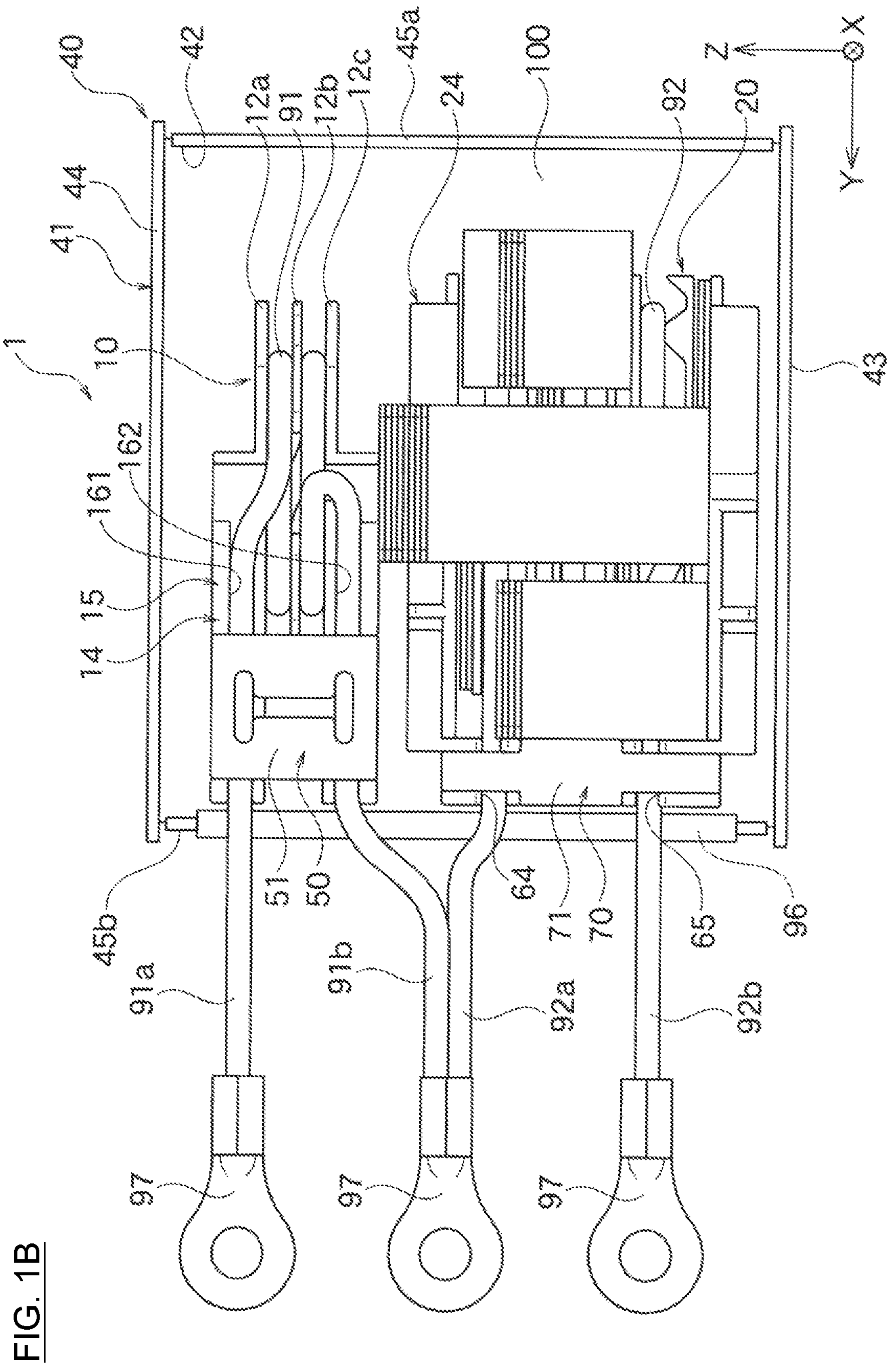
FIG. 1B is a side elevational view of the coil device shown in FIG. 1A viewed from direction IA.

As shown in FIGS. 1A and 1B, when the first bobbin 10 and the second bobbin 20 are accommodated in the case body 41, the case top 44 of the case body 41 is disposed above the first bobbin 10 so as to cover the first bobbin 10 from above; and the case bottom 43 of the case body 41 is disposed under the second bobbin 20 so as to cover the second bobbin 20 from below. With the case bottom 43 and the case top 44, the case body 41 covers the first bobbin 10 and the second bobbin 20 having the cores 30*a* to 30*c*, etc. from above and from below.

With the case bottom 43, the case top 44, and the case side 45, the case body 41 covers the first bobbin 10 and the second bobbin 20 having the cores 30*a* to 30*c*, etc. from five directions including from above and from below.

Preferably, a clearance is provided between the case top 44 of the case body 41 and an upper end part of the first bobbin 10 or an upper end part of the core 30*a* (a base 31*a*) attached to the first bobbin 10. A lower end part of the second bobbin 20 or a lower end part of the core 30*c* (a base 31*c*) attached to the second bobbin 20 may touch the case bottom 43 of the case body 41.

As shown in FIG. 2, each of the cores 30*a* to 30*c* is an E-shaped core having a substantially identical shape. The cores 30*a* to 30*c* may be made from any magnetic materials, such as metal and ferrite. The core 30*a* includes the base 31*a*, a pair of outer legs 32*a*, and a middle leg 33*a* and is attached to the first bobbin 10 from above. The core 30*b* includes a base 31*b*, a pair of outer legs 32*b*, and a middle leg 33*b* and is attached to the second bobbin 20 from above. The core 30*c* includes the base 31*c*, a pair of outer legs 32*c*, and a middle leg 33*c* and is attached to the second bobbin 20 from below.

Each of the bases 31*a* to 31*c* has a flat shape with a predetermined thickness. The widths of the bases 31*a* to 31*c* in the X-axis direction decrease towards their respective centers in the Y-axis direction. On the upper surface of the base 31*b*, a separation sheet 95 made from an insulating material is disposed. The core 30*b* is attached to the first bobbin 10 from below with the separation sheet 95 provided between the core 30*b* and the first bobbin 10.

One of the pair of outer legs 32*a* protrudes downwards from one end of the base 31*a* in the Y-axis direction. The other one of the pair of outer legs 32*a* protrudes downwards from the other end of the base 31*a* in the Y-axis direction. Similarly, one of the pair of outer legs 32*b* protrudes downwards from one end of the base 31*b* in the Y-axis direction. The other one of the pair of outer legs 32*b* protrudes downwards from the other end of the base 31*b* in the Y-axis direction.

One of the pair of outer legs 32*c* protrudes upwards from one end of the base 31*c* in the Y-axis direction. The other one of the pair of outer legs 32*c* protrudes upwards from the other end of the base 31*c* in the Y-axis direction. Inner surfaces (facing the middle legs 33*a* to 33*c*) of the outer legs 32*a* to 32*c* are curved to run along the circumferential direction of the middle legs 33*a* to 33*c*.

Each of the middle legs 33*a* to 33*c* has a cylindrical shape. The middle legs 33*a* to 33*c* are formed at the centers of the bases 31*a* to 31*c* in the Y-axis direction respectively. The middle legs 33*a* and 33*b* protrude downwards from the centers of the bases 31*a* and 31*b* in the Y-axis direction respectively. The middle leg 33*c* protrudes upwards from the center of the base 31*c* in the Y-axis direction.

Figure 6:
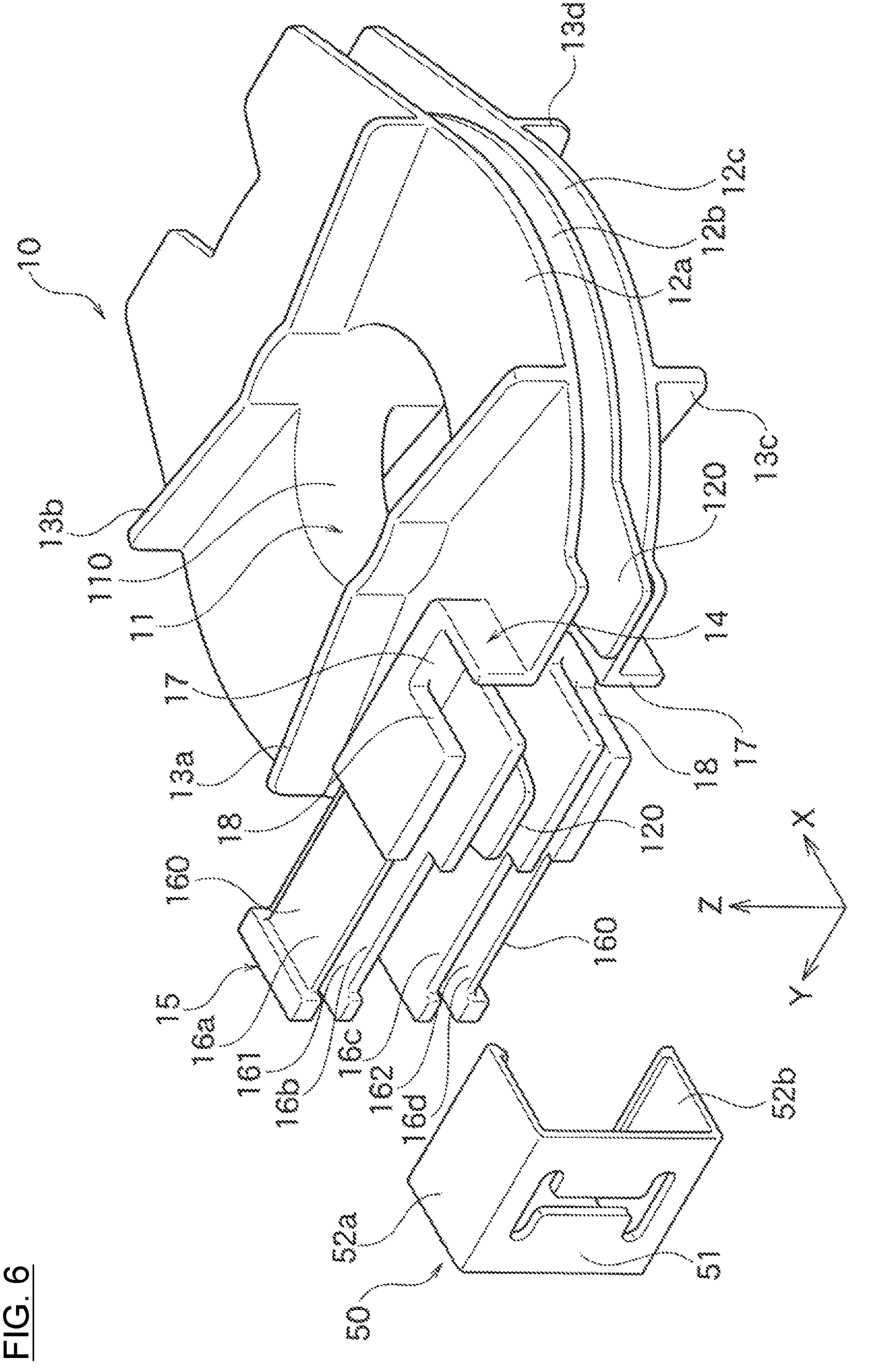
FIG. 6 is a perspective view of a first bobbin shown in FIG. 2 and a first stopper to be attached thereto.

As shown in FIG. 6, the first bobbin 10 is made from an insulating material and includes a cylindrical portion 11, flanges 12*a* to 12*c*, core fixing portions 13*a* to 13*d*, and a protrusion 14. The cylindrical portion 11 is tubular and has a through-hole 110. The middle leg 33*a* (FIG. 2) of the core 30*a* is inserted into the through-hole 110 from above.

Figure 7:
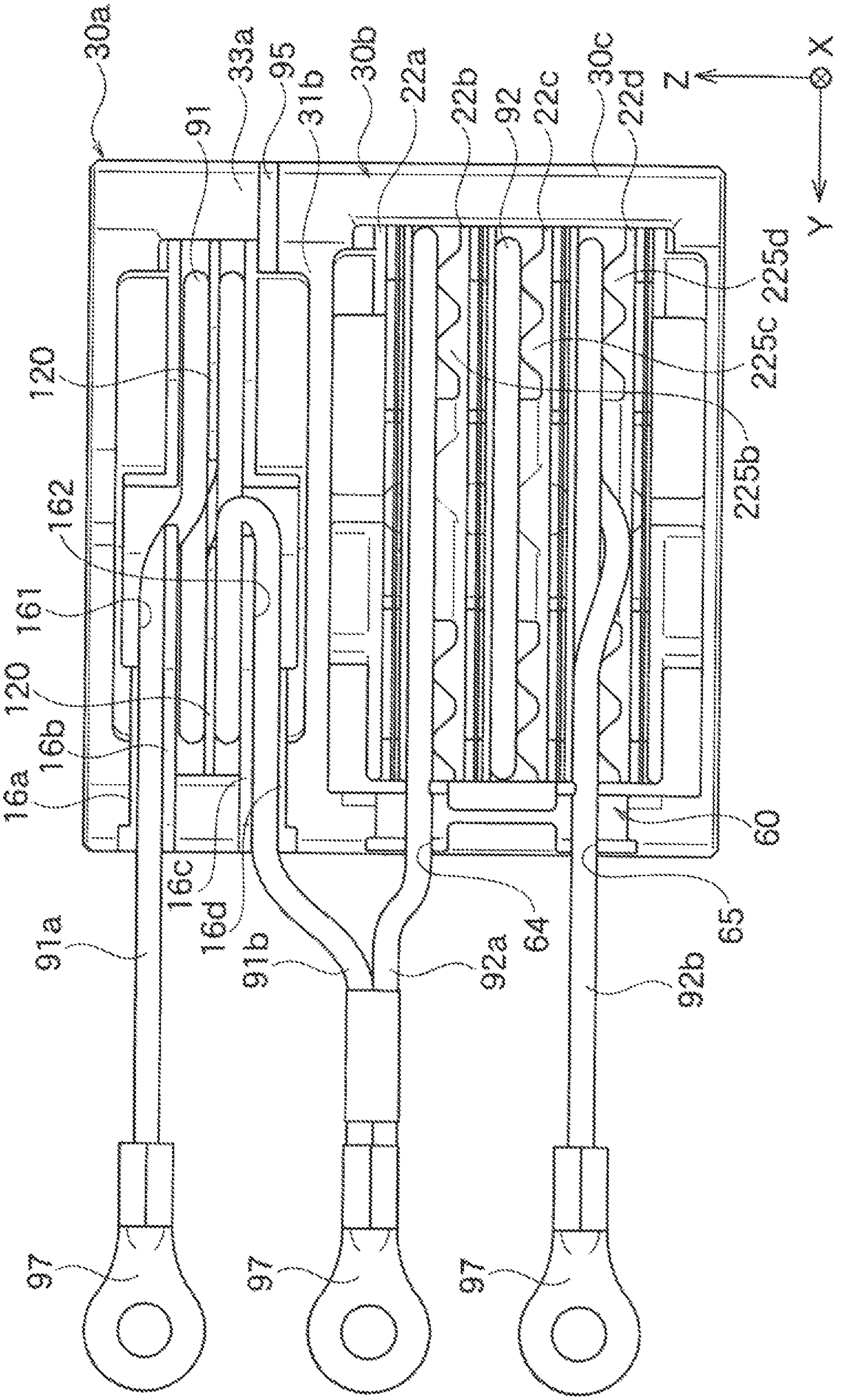
FIG. 7 is a side elevational view of windings of a first coil and a second coil shown in FIG. 1B.

The flanges 12*a* to 12*c* extend radially outwards from an outer circumferential surface of the cylindrical portion 11. The flange 12*a* is formed at an upper end of the cylindrical portion 11, and the flange 12*c* is formed at a lower end of the cylindrical portion 11. The flange 12*b* is formed between the flanges 12*a* and 12*c*. In the space between the flanges 12*a* and 12*b* and the space between the flanges 12*b* and 12*c*, the first coil 91 wound around the outer circumferential surface of the cylindrical portion 11 is disposed (FIG. 7). Note that, although only one turn of the first coil 91 is disposed in each space, two or more turns of the first coil 91 may be disposed.

An end of the flange 12*a* in the positive direction of the X-axis is provided with a cutout. The flanges 12*b* and 12*c* may be provided with a similar cutout. This cutout functions as, for example, a passage through which the potting resin 100 (FIG. 1B) filled into the case 40 flows.

On the upper surface of the flange 12*a*, the core fixing portions 13*a* and 13*b* protruding upwards are formed. The core fixing portions 13*a* and 13*b* are provided so that they run along the periphery of the base 31*a* of the core 30*a* (FIG. 2) fixed to the upper surface of the flange 12*a*, and are used for positioning the base 31*a*.

Similarly, on the lower surface of the flange 12*c*, the core fixing portions 13*c* and 13*d* protruding downwards are formed. The core fixing portions 13*c* and 13*d* are provided so that they run along the periphery of the base 31*b* of the core 30*b* (FIG. 2) fixed to the lower surface of the flange 12*c*, and are used for positioning the base 31*b*.

The protrusion 14 is formed at an end (a peripheral end) of the first bobbin 10 in the negative direction of the X-axis. As shown in FIGS. 1A and 1B, the protrusion 14 protrudes or is exposed from the case body 41 through the opening 42 laterally in the X-axis direction when the first bobbin 10 is accommodated in the case body 41. As mentioned above, the case 40 has only one opening 42, through which the protrusion 14 can protrude. Thus, the protrusion 14 protrudes in one direction (the negative direction of the X-axis) from the case body 41 through the opening 42. As shown in FIG. 5, part of the first bobbin 10 that is located more to the negative direction of the X-axis with respect to an imaginary line L (corresponding to the position of the opening (open side) 42) protrudes as the protrusion 14 from the case body 41.

As shown in FIG. 6, the protrusion 14 includes a guide portion 15 and partitioning walls 17. The partitioning walls 17 are formed on the upper surface of the flange 12*a* and the lower surface of the flange 12*c*. Each of the partitioning walls 17 includes a substantially L-shaped wall. The partitioning wall 17 on the upper surface of the flange 12*a* protrudes upwards and supports supplementary flanges 16*a* and 16*b* (explained later). The partitioning wall 17 on the lower surface of the flange 12*c* protrudes downwards and supports supplementary flanges 16*c* and 16*d* (explained later).

The guide portion 15 guides the leadout portions 91*a* and 91*b* (FIG. 7) of the first coil 91 drawn out from the first bobbin 10 towards a predetermined direction. More specifically, the guide portion 15 guides the leadout portions 91*a* and 91*b* drawn out laterally from the case body 41 through the opening 42 outwards in the Y-axis direction (away from the first bobbin 10) in the vicinity of the opening 42 (FIG. 1B).

The guide portion 15 includes the supplementary flanges 16*a* to 16*d*. The supplementary flanges 16*a* to 16*d* are disposed parallel to each other and protrude outwards in the Y-axis direction. The supplementary flanges 16*a* to 16*d* protrude in the same direction as the leadout portions 91*a* and 91*b* are drawn out. The supplementary flanges 16*a* to 16*d* protrude in one direction along the Y-axis (the positive direction of the Y-axis) and extend along the longitudinal direction of the core 30*a* (FIG. 2). The supplementary flanges 16*a* to 16*d* also extend in a direction parallel to the case bottom 43 or the case top 44, in the vicinity of the opening 42 (FIG. 1B) of the case 40.

The supplementary flanges 16*a* and 16*b* are connected to the partitioning wall 17 on the upper surface of the flange 12*a*. The supplementary flange 16*a* is formed at an upper end of the partitioning wall 17, and the supplementary flange 16*b* is formed at a lower end of the partitioning wall 17. The supplementary flanges 16*a* and 16*b* are disposed parallel to each other with a predetermined distance in between in the Z-axis direction. Between the supplementary flanges 16*a* and 16*b*, a guide path 161 through which the leadout portion 91*a* passes is provided. Drawing out the leadout portion 91*a* along the guide path 161 can guide the leadout portion 91*a* outwards in the Y-axis direction (FIG. 7).

The supplementary flanges 16*c* and 16*d* are connected to the partitioning wall 17 on the lower surface of the flange 12*c*. The supplementary flange 16*c* is formed at an upper end of the partitioning wall 17, and the supplementary flange 16*d* is formed at a lower end of the partitioning wall 17. The supplementary flanges 16*c* and 16*d* are disposed parallel to each other with a predetermined distance in between in the Z-axis direction. Between the supplementary flanges 16*c* and 16*d*, a guide path 162 through which the leadout portion 91*b* passes is provided. Drawing out the leadout portion 91*b* along the guide path 162 can guide the leadout portion 91*b* outwards in the Y-axis direction (FIG. 7).

Between the supplementary flanges 16*b* and 16*c*, an extended flange portion 120 of the flange 12*b* is disposed. As shown in FIG. 7, the extended flange portion 120 separates first and second layers of the first coil 91. The guide path 161 is located above the first layer of the first coil 91, and the leadout portion 91*a* passes outwards in the Y-axis direction above the first layer of the first coil 91. The guide path 162 is located below the second layer of the first coil 91, and the leadout portion 91*b* passes outwards in the Y-axis direction below the second layer of the first coil 91.

As shown in FIG. 6, a step 160 is formed on the upper surface of the supplementary flange 16*a*. Similarly, a step 160 is formed on the lower surface of the supplementary flange 16*d*. On the steps 160, a first stopper 50 is fixed. The first stopper 50 includes a body 51 and a pair of fixing portions 52*a* and 52*b*. The fixing portion 52*a* is formed at an upper end of the body 51 and protrudes in the direction orthogonal to the body 51. The fixing portion 52*b* is formed at a lower end of the body 51 and protrudes in the direction orthogonal to the body 51.

The fixing portion 52*a* is fixed to the step 160 of the supplementary flange 16*a*. The fixing portion 52*b* is fixed to the step 160 of the supplementary flange 16*d*. As shown in FIG. 1B, the body 51 covers at least part of the guide paths 161 and 162 from the direction (the X-axis direction) orthogonal to the extending direction (the Y-axis direction) of the leadout portions 91*a* and 91*b*. The body 51 can thus prevent lateral misalignment (in the X-axis direction), from the guide paths 161 and 162, of the leadout portions 91*a* and 91*b* drawn out along the guide paths 161 and 162, preventing the leadout portions 91*a* and 91*b* from falling off the guide paths 161 and 162.

As shown in FIG. 6, each of the supplementary flanges 16*a* to 16*d* is provided with a cutout 18. Each cutout 18 is located at a substantially center of the first bobbin 10 in the Y-axis direction. For example, when the first coil 91 is α-wound, the wire of the first coil 91 can be disposed on the outer circumferential surface of the cylindrical portion 11 through each cutout 18 for the wire to be wound around the cylindrical portion 11.

Figure 8A:
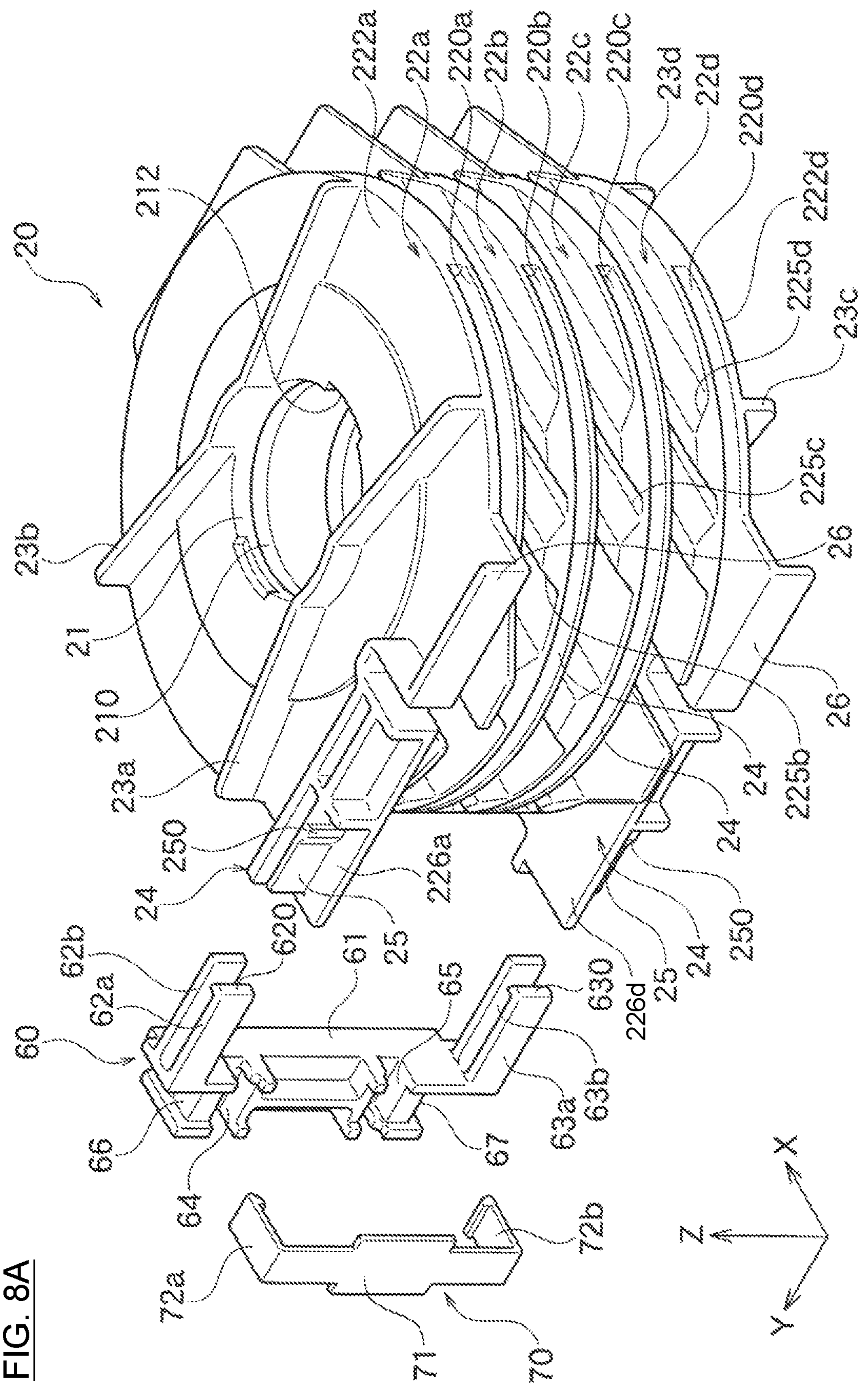
FIG. 8A is a perspective view of the second bobbin shown in FIG. 2, an attachment guide member to be attached to the second bobbin, and a second stopper to be attached to the attachment guide member.

As shown in FIG. 8A, the second bobbin 20 is made from an insulating material and includes a cylindrical portion 21, flanges 22*a* to 22*d*, core fixing portions 23*a* to 23*d*, and protrusions 24. The cylindrical portion 21 is tubular and has a through-hole 210. The middle leg 33*b* of the core 30*b* (FIG. 2) is inserted into the through-hole 210 from above, and the middle leg 33*c* of the core 30*c* is inserted into the through-hole 210 from below.

As shown in FIG. 5, the middle leg 33*a* inserted into the through-hole 110 of the first bobbin 10 and the middle legs 33*b* and 33*c* inserted into the through-hole 210 of the second bobbin 20 have different widths in the X-axis direction, namely W1 and W2 respectively. The width (W1) of the middle leg 33*a* in the X-axis direction is larger than the width (W2) of the middle legs 33*b* and 33*c* in the X-axis direction. In this case, the magnetic properties of the coil device 1 can be adjusted in accordance with the difference between the widths W1 and W2. Note that the widths W1 and W2 may be the same.

As shown in FIG. 8A, the flanges 22*a* to 22*d* extend radially outwards from an outer circumferential surface of the cylindrical portion 21. The flanges 22*a* to 22*d* may have any shape. Each of the flanges 22*a* to 22*d* has a substantially circular shape viewed from the Z-axis direction. The flange 22*a* is formed at an upper end of the cylindrical portion 21, and the flange 22*d* is formed at a lower end of the cylindrical portion 21. The flange 22*b* is formed below the flange 22*a*, and the flange 22*c* is formed above the flange 22*d*. In the space between the flanges 22*a* and 22*b*, the space between the flanges 22*b* and 22*c*, and the space between the flanges 22*c* and 22*d*, the second coil 92 wound around the outer circumferential surface of the cylindrical portion 21 is disposed (FIG. 7). Note that, although only one turn of the second coil 92 is disposed in each space, two or more turns of the second coil 92 may be disposed.

On the upper surface of the flange 22*a*, the core fixing portions 23*a* and 23*b* protruding upwards are formed. The core fixing portions 23*a* and 23*b* are provided so that they run along the periphery of the base 31*b* of the core 30*b* (FIG. 2) fixed to the upper surface of the flange 22*a*, and are used for positioning the base 31*b*.

On the lower surface of the flange 22*d*, the core fixing portions 23*c* and 23*d* protruding downwards are formed. The core fixing portions 23*c* and 23*d* are provided so that they run along the periphery of the base 31*c* of the core 30*c* (FIG. 2) fixed to the lower surface of the flange 22*d*, and are used for positioning the base 31*c*.

Figure 8B:
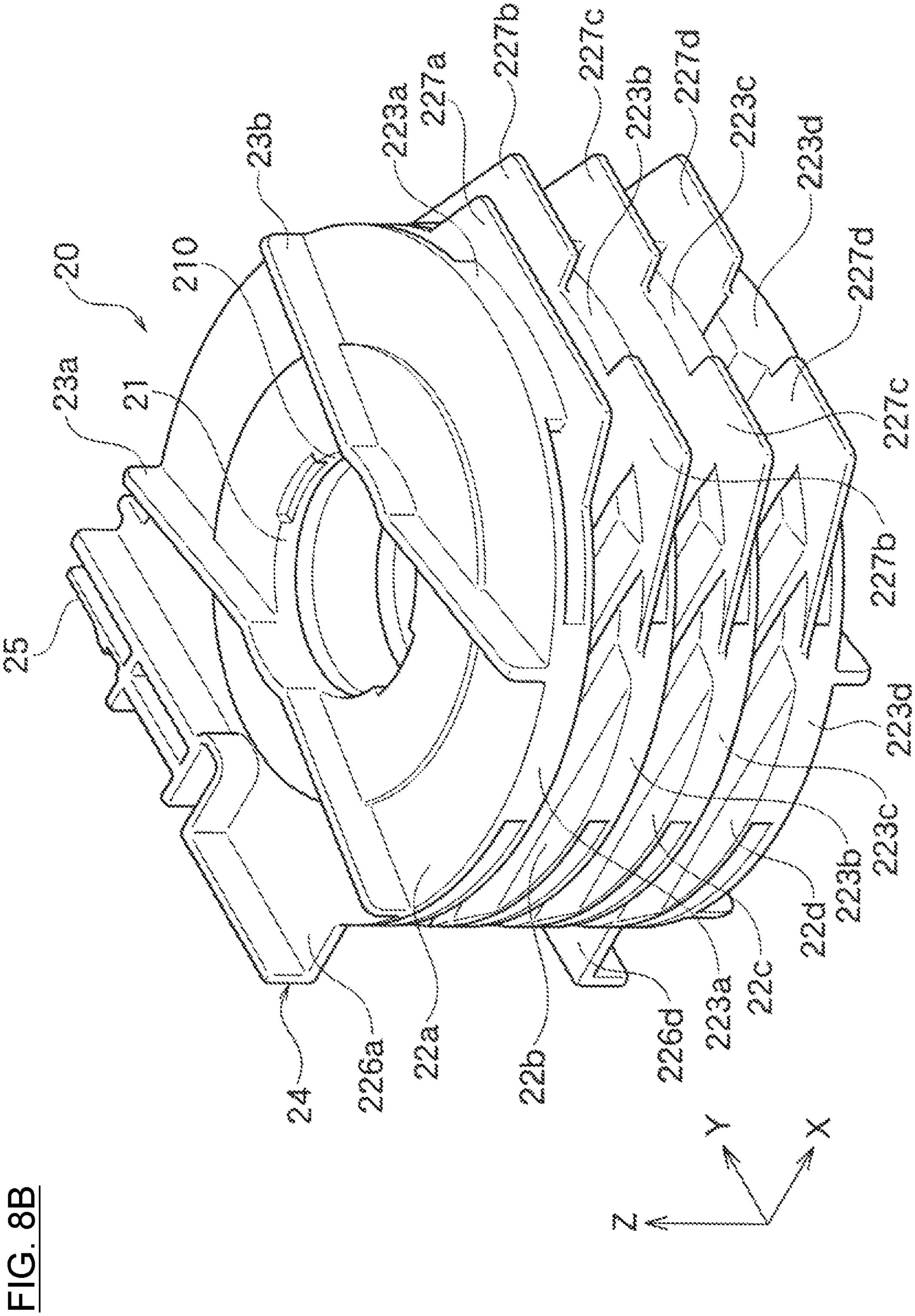
FIG. 8B is a perspective view of the second bobbin shown in FIG. 8A viewed from a different angle.

As shown in FIGS. 4 and 5, the flange 22*a* includes the accommodation groove 220*a*, an upper wall 221*a*, a lower wall 222*a*, and side walls 223*a*. The upper wall 221*a* and the lower wall 222*a* are disposed to face each other in the axial direction of the second bobbin 20. The side walls 223*a* connect outer edges of the upper wall 221*a* and the lower wall 222*a* in the Z-axis direction. The side walls 223*a* are formed at ends of the upper wall 221*a* and the lower wall 222*a* in the positive and negative directions of the Y-axis and at ends of the upper wall 221*a* and the lower wall 222*a* in the positive direction of the X-axis (FIG. 8B). The accommodation groove 220*a* is provided between the upper wall 221*a* and the lower wall 222*a* and extends along the direction orthogonal to the axial direction of the second bobbin 20.

At an end of the accommodation groove 220*a* in the negative direction of the X-axis, an insertion slot 224*a* for the flat coil 93*a* is provided. The insertion slot 224*a* is opened laterally in the X-axis direction and is located opposite one side wall 223*a* with respect to the X-axis direction. The insertion slot 224*a* is opened in the same direction as the direction in which the opening 42 of the case 40 (FIG. 2) is opened. This direction is the same as the direction orthogonal to the axial direction of the second bobbin 20. Through the insertion slot 224*a*, the flat coil 93*a* can be inserted into the accommodation groove 220*a* laterally in the X-axis direction. The flat coil 93*a* inserted into the accommodation groove 220*a* is fixed (positioned) by the side wall 223*a* at the end of the flange 22*a* in the positive direction of the X-axis.

The flanges 22*b* to 22*d* have the same structure as the flange 22*a*. The flanges 22*b* to 22*d* include the accommodation grooves 220*b* to 220*d*, upper walls 221*b* to 221*d*, lower walls 222*b* to 222*d*, and side walls 223*b* to 223*d* respectively. Through insertion slots 224*b* to 224*d*, the flat coils 93*b* to 93*d* are inserted into the accommodation grooves 220*b* to 220*d* laterally in the X-axis direction respectively. The flat coils 93*b* to 93*d* inserted into the accommodation grooves 220*b* to 220*d* are fixed (positioned) by the side walls 223*b* to 223*d* at the ends of the flanges 22*b* to 22*d* in the positive direction of the X-axis respectively.

As shown in FIG. 5, the cylindrical portion 21 is provided with cutouts 211 along its axial direction. The cutouts 211 are provided at respective locations corresponding to the accommodation grooves 220*a* to 220*d* (locations where the cylindrical portion 21 and the accommodation grooves 220*a* to 220*d* meet). Thus, at the locations corresponding to the accommodation grooves 220*a* to 220*d*, the cutouts 211 interrupt the cylindrical portion 21 in the Z-axis direction. Such a structure allows the flat coils 93*a* to 93*d* to be inserted into the accommodation grooves 220*a* to 220*d* laterally in the X-axis direction without being obstructed by the cylindrical portion 21.

As shown in FIG. 8A, the flanges 22*b* to 22*d* are provided with uneven portions 225*b* to 225*d*. The uneven portions 225*b* to 225*d* are formed on the respective upper surfaces of the upper walls 221*b* to 221*d* of the flanges 22*b* to 22*d*. Thus, the second coil 92 is disposed on the uneven portion 225*b* in the space between the flanges 22*a* and 22*b*, on the uneven portion 225*c* in the space between the flanges 22*b* and 22*c*, and on the uneven portion 225*d* in the space between the flanges 22*c* and 22*d*.

As shown in FIG. 8B, the flanges 22*a* to 22*d* are provided with flange end portions 227*a* to 227*d* respectively. The flange end portion 227*a* protrudes outwards in the X-axis direction from an end of the lower wall 222*a* (FIG. 5) of the flange 22*a* in the positive direction of the X-axis. The flange end portions 227*b* to 227*d* protrude outwards in the X-axis direction from ends of the upper walls 221*b* to 221*d* (FIG. 5) of the flanges 22*b* to 22*d* in the positive direction of the X-axis, respectively. Unlike the flange end portion 227*a*, the flange end portions 227*b* to 227*d* are bifurcated.

The flange end portion 227*a* covers from below and protects the protruding end portions 93*a*6 (FIG. 3) of the flat coil 93*a* (FIG. 5) accommodated in the accommodation groove 220*a*. The flange end portions 227*b* to 227*d* cover from above and protect the protruding end portions 93*b*6 to 93*d*6 (FIG. 3) of the flat coils 93*b* to 93*d* (FIG. 5) accommodated in the accommodation grooves 220*b* to 220*d*, respectively.

As shown in FIG. 8A, ends of the flanges 22*a* and 22*d* in the negative direction of the X-axis are provided with wide portions 226*a* and 226*d* respectively. More specifically, the wide portion 226*a* is provided widely in the Y-axis direction at the upper wall 221*a* of the flange 22*a*, and the wide portion 226*d* is provided widely in the Y-axis direction at the lower wall 222*d* of the flange 22*d*. The wide portions 226*a* and 226*d* are used for stably holding an attachment guide member 60 (explained later).

The protrusions 24 are formed at an end (a peripheral end) of the second bobbin 20 in the negative direction of the X-axis. As shown in FIGS. 1A and 1B, the protrusions 24 protrude or are exposed from the case body 41 through the opening 42 laterally in the X-axis direction when the second bobbin 20 is accommodated in the case body 41. As mentioned above, the case 40 has only one opening 42, through which the protrusions 24 can protrude. Thus, the protrusions 24 protrude through the opening 42 in one direction (the negative direction of the X-axis) from the case body 41.

As shown in FIG. 5, part of the second bobbin 20 that is located more to the negative direction of the X-axis with respect to the imaginary line L protrudes as the protrusions 24 from the case body 41. More specifically, ends of the upper wall 221*a* and the lower wall 222*a* of the flange 22*a* in the negative direction of the X-axis protrude as the protrusions 24 from the case body 41; ends of the upper wall 221*b* and the lower wall 222*b* of the flange 22*b* in the negative direction of the X-axis protrude as the protrusions 24 from the case body 41; ends of the upper wall 221*c* and the lower wall 222*c* of the flange 22*c* in the negative direction of the X-axis protrude as the protrusions 24 from the case body 41; and ends of the upper wall 221*d* and the lower wall 222*d* of the flange 22*d* in the negative direction of the X-axis protrude as the protrusions 24 from the case body 41.

Thus, the insertion slots 224*a* to 224*d* protrude laterally from the case body 41, thereby allowing the flat coils 93*a* to 93*d* to be easily inserted into the accommodation grooves 220*a* to 220*d* respectively.

Ends of the flat coils 93*a* to 93*d* in the negative direction of the X-axis or the leadout portions thereof protrude from the case body 41 through the opening 42 together with the protrusions 24. Outside the case body 41, the ends of the flat coils 93*a* to 93*d* in the negative direction of the X-axis are fixed to the protrusions 24 (upper surfaces of the lower walls 222*a* to 222*d* of the flanges 22*a* to 22*d*). This allows for prevention of misalignment of the flat coils 93*a* to 93*d* in the Z-axis direction.

As shown in FIG. 8A, the protrusions 24 include nipped portions 25 and wall portions 26. The nipped portions 25 and the wall portions 26 are formed on the upper surface of the wide portion 226*a* and the lower surface of the wide portion 226*b*. The wall portion 26 on the upper surface of the wide portion 226*a* protrudes upwards and extends from one end to the other end of the wide portion 226*a* in the Y-axis direction. The wall portion 26 on the lower surface of the wide portion 226*d* protrudes downwards and extends from one end to the other end of the wide portion 226*d* in the Y-axis direction.

The nipped portion 25 on the upper surface of the wide portion 226*a* has a plate shape protruding upwards and extends along the Y-axis direction for a predetermined length. Although detailed description is omitted, the nipped portion 25 on the lower surface of the wide portion 226*d* has a flat shape protruding downwards and extends along the Y-axis direction for a predetermined length. To these nipped portions 25, nipping portions 62*a* and 62*b* and nipping portions 63*a* and 63*b* of the attachment guide member 60 (explained later) are attached. These nipped portions 25 are provided with engaging protrusions 250 that engage with hooks 620 and 630 of the nipping portions 62*a* and 63*a*.

The attachment guide member 60 is made separately from the second bobbin 20 and is attached to the protrusions 24. Similarly to the protrusions 24, the attachment guide member 60 protrudes laterally from the case body 41. The attachment guide member 60 guides the leadout portions 92*a* and 92*b* of the second coil 92 drawn out from the second bobbin 20 towards a predetermined direction. More specifically, as shown in FIG. 7, the attachment guide member 60 guides the leadout portions 92*a* and 92*b* drawn out laterally from the case body 41 through the opening 42 outwards in the Y-axis direction (away from the second bobbin 20) in the vicinity of the opening 42 (FIG. 1B). As shown in FIG. 8A, the attachment guide member 60 includes a body 61, the nipping portions 62*a* and 62*b*, the nipping portions 63*a* and 63*b*, guide paths 64 and 65, and fixing portions 66 and 67.

The body 61 extends along the axial direction of the second bobbin 20. The pair of nipping portions 62*a* and 62*b* is formed at an upper end of the body 61 and protrudes in the direction orthogonal to the body 61. The nipping portions 62*a* and 62*b* nip the nipped portion 25 of the protrusion 24 of the flange 22*a*. At the tip of the nipping portion 62*a*, the hook 620 is formed. The hook 620 engages with the engaging protrusion 250 of the nipped portion 25.

The pair of nipping portions 63*a* and 63*b* is formed at a lower end of the body 61 and protrudes in the direction orthogonal to the body 61. The nipping portions 63*a* and 63*b* nip the nipped portion 25 of the protrusion 24 of the flange 22*d*. At the tip of the nipping portion 63*a*, the hook 630 is formed. The hook 630 engages with the engaging protrusion 250 of the nipped portion 25. The nipping portions 62*a* and

62*b* and the nipping portions 63*a* and 63*b* allow for attachment of the attachment guide member 60 to the second bobbin 20.

The guide path 64 is provided with a groove extending from one end to the other end of the body 61 in the Y-axis direction, below the nipping portions 62*a* and 62*b*. The guide path 65 is provided with a groove extending from one end to the other end of the body 61 in the Y-axis direction, above the nipping portions 63*a* and 63*b*.

As shown in FIG. 7, the leadout portions 92*a* and 92*b* pass through the guide paths 64 and 65 respectively. Drawing out the leadout portions 92*a* and 92*b* along the guide paths 64 and 65 respectively can guide the leadout portion 92*a* and 92*b* outwards in the Y-axis direction.

As shown in FIG. 8A, the fixing portion 66 is formed at the upper end of the body 61 and has a substantially flat surface. The fixing portion 67 is formed at the lower end of the body 61 and has a substantially flat surface. On the fixing portion 66, a nipping portion 72*a* of a second stopper 70 is fixed. On the fixing portion 67, a nipping portion 72*b* of the second stopper 70 is fixed.

The second stopper 70 includes a body 71 and the pair of nipping portions 72*a* and 72*b*. The body 71 extends along the extending direction of the body 61 of the attachment guide member 60. The nipping portion 72*a* is formed at an upper end of the body 71 and protrudes in the direction orthogonal to the body 71. The nipping portion 72*b* is formed at a lower end of the body 71 and protrudes in the direction orthogonal to the body 71. The nipping portions 72*a* and 72*b* are fixed to the fixing portions 66 and 67 of the attachment guide member 60 respectively so as to nip the body 61 of the attachment guide member 60. This allows the second stopper 70 to be attached to the attachment guide member 60 using the nipping portions 72*a* and 72*b*.

Figure 9:
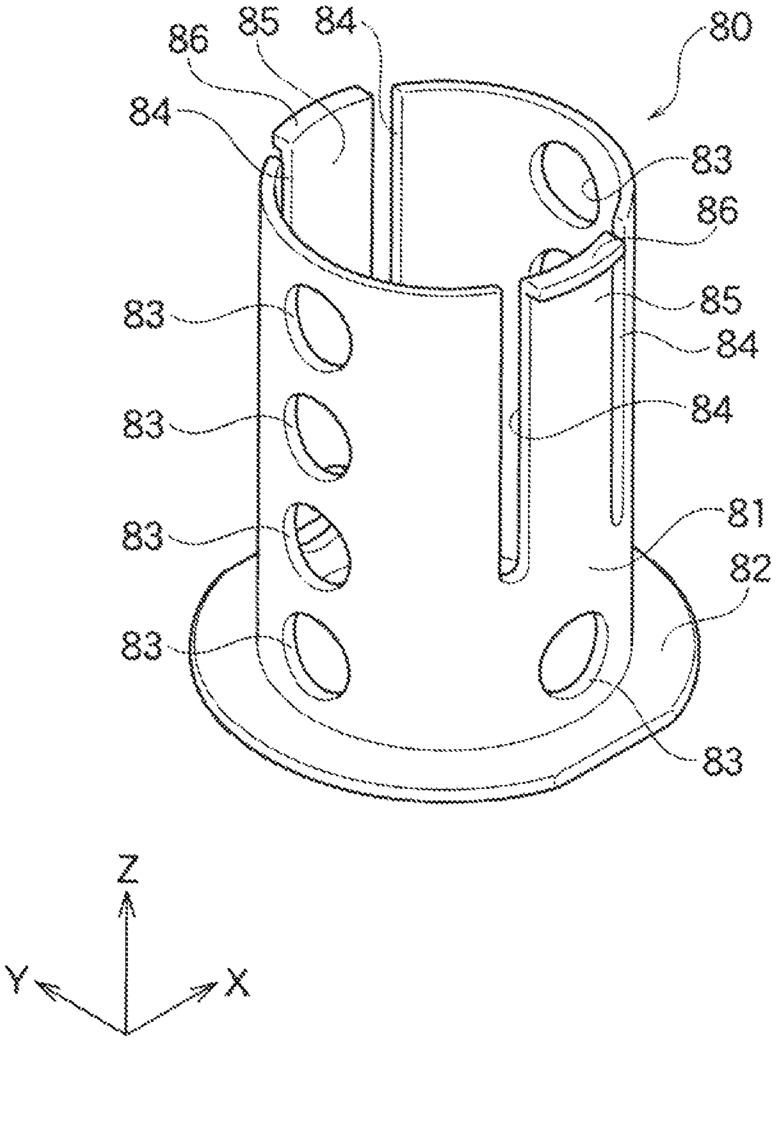
FIG. 9 is a perspective view of a retainer member to be attached to the second bobbin shown in FIG. 8A.

As shown in FIG. 9, a retainer member 80 is made from an insulating material and includes a tubular portion 81, a fixing flange 82, holes 83, grooves 84, elastic portions 85, and hooks 86. The retainer member 80 is made separately from the second bobbin 20 (FIG. 8A) and is inserted into the through-hole 210 of the second bobbin 20, for example, from below. The retainer member 80 is disposed at inner circumferential sides of the flat coils 93*a* to 93*d* (FIG. 3) when inserted into the through-hole 210.

The tubular portion 81 has a tubular shape. The upper end of the tubular portion 81 is opened, whereas the lower end of the tubular portion 81 is closed. As shown in FIG. 5, when the retainer member 80 is disposed in the through-hole 210, the middle leg 33*b* of the core 30*b* and the middle leg 33*c* of the core 30*c* are disposed inside the tubular portion 81. Thus, the tubular portion 81 is disposed between the outer circumferential surfaces of the middle legs 33*b* and 33*c* and the inner circumferential surfaces of the flat coils 93*a* to 93*d*. Note that a gap may be provided between the tip of the middle leg 33*b* of the core 30*b* and the tip of the middle leg 33*c* of the core 30*c*.

As shown in FIG. 9, the fixing flange 82 is formed at the lower end of the tubular portion 81 to form the bottom of the tubular portion 81. The fixing flange 82 protrudes radially outwards from an outer circumferential surface of the tubular portion 81. As shown in FIG. 5, the fixing flange 82 is fixed on the lower surface (the lower wall 222*d*) of the flange 22*d* of the second bobbin 20. The fixing flange 82 fixes (positions) the retainer member 80 in the through-hole 210 at a predetermined location.

The holes 83 are provided on the outer circumferential surface of the tubular portion 81 and penetrate the tubular portion 81 from its inner circumferential surface to its outer circumferential surface. The tubular portion 81 may be provided with a plurality of holes 83. The holes 83 function as a passage through which the potting resin 100 filled into the case 40 (FIG. 1A) flows into the tubular portion 81.

The grooves (slits) 84 extend downwards from the upper end of the tubular portion 81. The tubular portion 81 is provided with pairs of grooves 84 at a plurality of locations. Each of the elastic portions 85 is provided between one groove 84 and the other groove 84 of each pair. Because each of the elastic portions 85 has a relatively small width, the elastic portion 85 has elasticity (flexibility or deformability). Thus, when the retainer member 80 is inserted into the through-hole 210 of the second bobbin 20 (FIG. 5), elastic deformation of the elastic portions 85 occurs, allowing the retainer member 80 to be easily inserted into the through-hole 210.

The hooks 86 are formed at upper ends of the respective elastic portions 85 and protrude radially outwards from the tubular portion 81. The hooks 86 engage with engaging recesses 212 (FIG. 8A) at the upper end of the cylindrical portion 21.

Next, a method of manufacturing the coil device 1 will be explained. First, the components shown in FIG. 2 are prepared. Then, the cores 30*a* and 30*b* are attached to the first bobbin 10. Note that the core 30*b* is attached to the first bobbin 10 with the separation sheet 95 provided between the core 30*b* and the first bobbin 10. The cores 30*b* and 30*c* are attached also to the second bobbin 20.

Next, a wire is wound around the cylindrical portion 11 of the first bobbin 10 to give the first coil 91. Another wire is wound around the cylindrical portion 21 of the second bobbin 20 to give the second coil 92. As shown in FIG. 5, the flat coils 93*a* to 93*d* are inserted into the accommodation grooves 220*a* to 220*d* laterally in the X-axis direction through the insertion slots 224*a* to 224*d* respectively. Preferably, the flat coils 93*a* to 93*d* are inserted into the accommodation grooves 220*a* to 220*d* respectively after the second coil 92 is formed.

Next, the first bobbin 10 and the second bobbin 20 with the cores 30*a* to 30*c*, etc. are accommodated in the case 40 shown in FIG. 2. To the second side 45*b* of the case body 41, the wire protecting member 96 is attached. Then, the case body 41 is filled with the potting resin 100, and the potting resin 100 is hardened.

Next, as shown in FIGS. 1B and 7, the leadout portions 91*a* and 91*b* of the first coil 91 are drawn out from the case body 41 through the opening 42 laterally in the X-axis direction. The leadout portions 91*a* and 91*b* of the first coil 91 are drawn out along the guide paths 161 and 162 of the guide portion 15 outwards in the Y-axis direction from the case body 41. Then, the first stopper 50 is attached to the guide portion 15.

As shown in FIGS. 1B and 7, the leadout portions 92*a* and 92*b* of the second coil 92 are drawn out from the case body 41 through the opening 42 laterally in the X-axis direction. The attachment guide member 60 is attached to the second bobbin 20, and the leadout portions 92*a* and 92*b* of the second coil 92 are drawn out along the guide paths 64 and 65 of the attachment guide member 60 outwards in the Y-axis direction from the case body 41. Then, as shown in FIG. 1B, the second stopper 70 is attached to the attachment guide member 60. The above process can give the coil device 1.

As explained above, in the present embodiment, laterally inserting the flat coils 93*a* to 93*d* into the accommodation grooves 220*a* to 220*d* of the second bobbin 20 as shown in FIGS. 4 and 5 allows the flat coils 93*a* to 93*d* to be easily accommodated in the accommodation grooves 220_a_ to 220_d_. Thus, the second bobbin 20 is not required to be made up of a plurality of parts in accommodating the flat coils 93_a_ to 93_d_. It is thus possible to omit a complicated operation such as combining the parts and the flat coils 93_a_ to 93_d_, allowing for easier manufacture of the coil device 1. The need for consideration of tolerance of the parts is also eliminated, allowing for sufficiently high positioning accuracy of the coil device 1.

In particular, in the present embodiment, inserting the retainer member 80 into the through-hole 210 while the flat coils 93_a_ to 93_d_ are accommodated in the accommodation grooves 220_a_ to 220_d_ makes the inner circumferential surfaces of the flat coils 93_a_ to 93_d_ engage with the tubular portion 81, which can prevent misalignment of the flat coils 93_a_ to 93_d_ with respect to their insertion direction. Thus, the flat coils 93_a_ to 93_d_ can be prevented from falling out through the insertion slots 224_a_ to 224_d_ when laterally inserted into the accommodation grooves 220_a_ to 220_d_ of the second bobbin 20. The flat coils 93_a_ to 93_d_ can thus be fixed to predetermined locations of the accommodation grooves 220_a_ to 220_d_ respectively. This allows for remarkable increase of positioning accuracy of the flat coils 93_a_ to 93_d_.

Making the retainer member 80 separately from the second bobbin 20 allows the retainer member 80 to be attached to the second bobbin 20 afterwards. In particular, attaching the retainer member 80 to the second bobbin 20 after the flat coils 93_a_ to 93_d_ are accommodated in the accommodation grooves 220_a_ to 220_d_ prevents insertion passages for the flat coils 93_a_ to 93_d_ inside the accommodation grooves 220_a_ to 220_d_ from being blocked by the retainer member 80, allowing the flat coils 93_a_ to 93_d_ to be smoothly inserted into the accommodation grooves 220_a_ to 220_d_.

Inside the tubular portion 81, the middle legs 33_b_ and 33_c_ of the cores 30_b_ and 30_c_ are disposed. Thus, the tubular portion 81 can favorably insulate the middle legs 33_b_ and 33_c_ from the flat coils 93_a_ to 93_d_.

The potting resin 100 filling the case 40 flows into the tubular portion 81 through the holes 83 (FIG. 9). Thus, the tubular portion 81 can be sufficiently filled with the potting resin 100, allowing for greater heat dissipation particularly around the middle legs 33_b_ and 33_c_ disposed inside the tubular portion 81.

Because the accommodation grooves 220_a_ to 220_d_ are integrated with the flanges 22_a_ to 22_d_, the second bobbin 20 can be simplified compared to when the accommodation grooves 220_a_ to 220_d_ are provided for the second bobbin 20 apart from the flanges 22_a_ to 22_d_. Additionally, less space for the accommodation grooves 220_a_ to 220_d_ is needed, allowing the coil device 1 to have a smaller size, by extension.

At the locations of the cylindrical portion 21 corresponding to the accommodation grooves 220_a_ to 220_d_, the cutouts 211 interrupt the cylindrical portion 21 in its axial direction. Thus, the insertion passages for the flat coils 93_a_ to 93_d_ inside the accommodation grooves 220_a_ to 220_d_ can be prevented from being blocked by the cylindrical portion 21. This allows the flat coils 93_a_ to 93_d_ to be smoothly accommodated in the accommodation grooves 220_a_ to 220_d_ through the cutouts 211 of the cylindrical portion 21, without being obstructed by the cylindrical portion 21.

The flat coils 93_a_ to 93_d_ are accommodated in the accommodation grooves 220_a_ to 220_d_ so as to be covered by the upper walls 221_a_ to 221_d_ and the lower walls 222_a_ to 222_d_. Thus, the flat coils 93_a_ to 93_d_ can be protected from the outside environment and effectively insulated from other conductors.

The ends of the accommodation grooves 220_a_ to 220_d_ in the depth direction are closed with the side walls 223_a_ to 223_d_. Thus, the flat coils 93_a_ to 93_d_ can be prevented from falling off the accommodation grooves 220_a_ to 220_d_ from the ends thereof in the positive direction of the X-axis when inserted through the insertion slots 224_a_ to 224_d_ into the accommodation grooves 220_a_ to 220_d_ to the rear.

Providing one bobbin (the second bobbin 20) with both the flat coils 93_a_ to 93_d_ and the second coil 92 allows the coil device 1 to have a smaller size. Inserting the flat coils 93_a_ to 93_d_ into the accommodation grooves 220_a_ to 220_d_ after, for example, the second coil 92 is wound around the second bobbin 20 allows the second coil 92 to be wound around the second bobbin 20 without being obstructed by the flat coils 93_a_ to 93_d_ and allows the flat coils 93_a_ to 93_d_ to be inserted into the second bobbin 20 without being obstructed by the second coil 92.

The present invention is not limited to the above-mentioned embodiment and can variously be modified within the scope of the present invention.

In the description of the above-mentioned embodiment, an example of applying the present invention to a transformer has been explained. However, the present invention can be applied not only to the transformer but also to other coil devices.

As shown in FIG. 2, in the above-mentioned embodiment, the bobbins include two bobbins, namely the first bobbin 10 and the second bobbin 20. However, the bobbins may include only one bobbin. Alternatively, the bobbins of the coil device 1 may include three or more bobbins. The first bobbin 10 is not essential and may be, together with the first coil 91, omitted from the coil device 1.

As shown in FIGS. 1A and 1B, in the above-mentioned embodiment, the first bobbin 10 and the second bobbin 20 are accommodated in the case 40 so that their wounding axes are substantially orthogonal to the mounting surface. However, the first bobbin 10 and the second bobbin 20 may be accommodated in the case 40 so that their wounding axes are substantially parallel to the mounting surface.

As shown in FIG. 2, in the above-mentioned embodiment, the case 40 is provided with only one opening 42. However, the case 40 may be provided with two or more openings 42.

In the above-mentioned embodiment, the case 40 has the opening 42, which is opened laterally. However, the case 40 may be opened upwards.

NUMERICAL REFERENCES

1 . . . coil device
10 . . . first bobbin
11 . . . cylindrical portion
110 . . . through-hole
12_a_ to 12_c_ . . . flange
120 . . . extended flange portion
13_a_ to 13_d_ . . . core fixing portion
14 . . . protrusion
15 . . . guide portion
16_a_ to 16_d_ . . . supplementary flange
160 . . . step
161, 162 . . . guide path
17 . . . partitioning wall
18 . . . cutout
20 . . . second bobbin
21 . . . cylindrical portion

210 . . . through-hole
211 . . . cutout
212 . . . engaging recess
22*a* to 22*d* . . . flange
220*a* to 220*d* . . . accommodation groove
221*a* to 221*d* . . . upper wall
222*a* to 222*d* . . . lower wall
223*a* to 223*d* . . . side wall
224*a* to 224*d* . . . insertion slot
225*b* to 225*d* . . . uneven portion
226*a*, 226*d* . . . wide portion
227*a* to 227*d* . . . flange end portion
23*a* to 23*d* . . . core fixing portion
24 . . . protrusion
25 . . . nipped portion
250 . . . engaging protrusion
26 . . . wall portion
30*a* to 30*c* . . . core
31*a* to 31*c* . . . base
32*a* to 32*c* . . . outer leg
33*a* to 33*c* . . . middle leg
40 . . . case
41 . . . case body
42 . . . opening
43 . . . case bottom
44 . . . case top
45 . . . case side
50 . . . first stopper
51 . . . body
52*a*, 52*b* . . . fixing portion
60 . . . attachment guide member
61 . . . body
62*a*, 62*b*, 63*a*, 63*b* . . . nipping portion
620, 630 . . . hook
64, 65 . . . guide path
66, 67 . . . fixing portion
70 . . . second stopper
71 . . . body
72*a*, 72*b* . . . nipping portion
80 . . . retainer member
81 . . . tubular portion
82 . . . fixing flange
83 . . . hole
84 . . . groove
85 . . . elastic portion
86 . . . hook
91 . . . first coil
92 . . . second coil
93*a*, 93*b*, 93*c*, 93*d* . . . flat coil
93*a*1, 93*a*2, 93*b*1, 93*b*2, 93*c*1, 93*c*2, 93*d*1, 93*d*2 . . . sheet
93*a*3, 93*a*4, 93*b*3, 93*b*4, 93*c*3, 93*c*4, 93*d*3, 93*d*4 . . . leadout portion
93*a*5, 93*b*5, 93*c*5, 93*d*5 . . . projecting portion
93*a*6, 93*b*6, 93*c*6, 93*d*6 . . . protruding end portion
95 . . . separation sheet
96 . . . wire protecting member
97 . . . terminal
100 . . . potting resin

What is claimed is:

1. A coil device comprising:
a core;
a plurality of flat coils each having a flat wire;
a bobbin having a through-hole in which a leg of the core is disposed and a plurality of accommodation grooves into which the plurality of flat coils are laterally inserted; and
a retainer member inserted into the through-hole and disposed at an inner circumferential side of the plurality of flat coils, wherein
the bobbin comprises a cylindrical portion and flanges extending radially outwards from an outer circumferential surface of the cylindrical portion and connected by the cylindrical portion in an axial direction of the cylindrical portion;
the flanges have the plurality of accommodation grooves to insert plurality of flat coils; and
the cylindrical portion has cutouts that are continuous with the plurality of accommodation grooves and divide the cylindrical portion into a plurality of the parts in the axial direction.

2. The coil device according to claim 1, wherein
the retainer member is made separately from the bobbin.

3. The coil device according to claim 2, wherein
the retainer member comprises a tubular portion;
the leg of the core is disposed inside the tubular portion; and
the tubular portion is disposed between an outer circumferential surface of the leg and an inner circumferential surface of the plurality of flat coils.

4. The coil device according to claim 1, wherein
the retainer member comprises a tubular portion;
the leg of the core is disposed inside the tubular portion; and
the tubular portion is disposed between an outer circumferential surface of the leg and an inner circumferential surface of the plurality of flat coils.

5. The coil device according to claim 4, wherein
the tubular portion has a hole penetrating a wall of the tubular portion along a radial direction thereof.

6. The coil device according to claim 1, wherein
each of the flanges comprises an upper wall and a lower wall facing the upper wall in an axial direction of the bobbin; and
the at least one of the plurality of accommodation grooves is provided between the upper wall and the lower wall of each flange.

7. The coil device according to claim 6, wherein
each of the flanges comprises a side wall connecting an outer edge of the upper wall of the flange and an outer edge of the lower wall of the flange along the axial direction of the bobbin;
each flange has an insertion slot for inserting a corresponding one of the plurality of flat coils into a corresponding one of the plurality of accommodation grooves; and
the side wall of each flange is located opposite the insertion slot with respect to a direction orthogonal to the axial direction.

8. The coil device according to claim 1, wherein
the coil device further comprises a first coil including a first wire and a second coil including a second wire;
the bobbin comprises a first bobbin provided with the first coil and a second bobbin provided with the second coil; and
the plurality of flat coils are laterally inserted into the second bobbin.

9. The coil device according to claim 8, wherein
the core comprises a first core and a second core;
the first bobbin has a first through-hole in which a first leg of the first core is disposed;
the second bobbin has a second through-hole in which a second leg of the second core is disposed; and the first leg and the second leg have different widths in a direction orthogonal to an extending direction of the first and second legs.

10. The coil device according to claim 1, wherein the coil device further comprises a case accommodating the core and the bobbin, and a heat dissipating resin filling the case.

11. A coil device comprising:

a core;

a flat coil having a flat wire;

a bobbin having a through-hole in which a leg of the core is disposed and an accommodation groove into which the flat coil is laterally inserted; and a retainer member inserted into the through-hole and disposed at an inner circumferential side of the flat coil, wherein the coil device further comprises a first coil including a first wire and a second coil including a second wire;

the bobbin comprises a first bobbin provided with the first coil and a second bobbin provided with the second coil;

the flat coil is laterally inserted into the second bobbin;

the core comprises a first core and a second core;

the first bobbin has a first through-hole in which a first leg of the first core is disposed;

the second bobbin has a second through-hole in which a second leg of the second core is disposed; and the first leg and the second leg have different widths in a direction orthogonal to an extending direction of the first and second legs.

* * * * *